United States Patent [19]
Batson

[11] Patent Number: 5,800,715
[45] Date of Patent: Sep. 1, 1998

[54] SEPARATION OF A SUSPENSION INTO ITS COMPONENT PARTS

[75] Inventor: Richard Guy Batson, Benoni, South Africa

[73] Assignee: Baker Hughes Incorporated, Houston, Tex.

[21] Appl. No.: 693,116

[22] PCT Filed: Feb. 15, 1995

[86] PCT No.: PCT/NL95/00060

§ 371 Date: Jan. 13, 1997

§ 102(e) Date: Jan. 13, 1997

[87] PCT Pub. No.: WO95/22391

PCT Pub. Date: Aug. 24, 1995

[30] Foreign Application Priority Data

Feb. 16, 1994 [ZA] South Africa ............... 94/1062

[51] Int. Cl.[6] ................................................. B01D 21/08
[52] U.S. Cl. .................. 210/702; 210/801; 210/519; 210/521; 210/532.1
[58] Field of Search ............... 210/702, 801, 210/519, 521, 522, 532.1, 540

[56] References Cited

U.S. PATENT DOCUMENTS

| | | | |
|---|---|---|---|
| 1,177,849 | 4/1916 | De Kalb | 210/519 |
| 1,578,625 | 3/1926 | Ankeny | 210/522 |
| 1,648,607 | 11/1927 | Brown | 210/522 |
| 1,770,353 | 7/1930 | Weber | 210/801 |
| 1,940,794 | 12/1933 | Fisher | 210/522 |
| 2,573,615 | 10/1951 | Senitty | 210/521 |
| 3,613,889 | 10/1971 | Reed | 210/522 |
| 3,965,013 | 6/1976 | Jackson | 210/519 |
| 4,274,958 | 6/1981 | Fitch | 210/519 |
| 4,406,789 | 9/1983 | Brignon | 210/519 |
| 5,013,435 | 5/1991 | Rider et al. | 210/521 |
| 5,264,121 | 11/1993 | Guzman-Sanchez | 210/540 |

FOREIGN PATENT DOCUMENTS

| | | |
|---|---|---|
| 0 585 103 | 3/1994 | European Pat. Off. . |
| 3836704 | 6/1989 | Germany . |
| 88/0772 | 2/1988 | South Africa . |
| 1194831 | 6/1970 | United Kingdom . |

OTHER PUBLICATIONS

*Patent Abstracts of Japan*, vol. 10, No. 208 (C–361) dated 22 Jul. 1986 & JP,A,61 050610 (Toru Matsuoka) dated 12 Mar. 1986.

*Primary Examiner*—Christopher Upton

[57] ABSTRACT

The invention provides a method of separating particulate material from a carrier fluid in which it is suspended. A first zone of a body of the carrier fluid is separated from a second clarified fluid zone thereof, and a suspension of particulate material in carrier fluid is fed into the body of fluid. Clarified fluid is withdrawn from the clarified fluid zone, and substantially all the clarified fluid which enters the clarified fluid zone is allowed to pass from the first zone to the second zone through a sub-zone in which at least some separation of particulate material from carrier fluid, against the direction of flow, takes place. The sub-zone is of smaller cross-sectional area than the body of fluid.

12 Claims, 6 Drawing Sheets

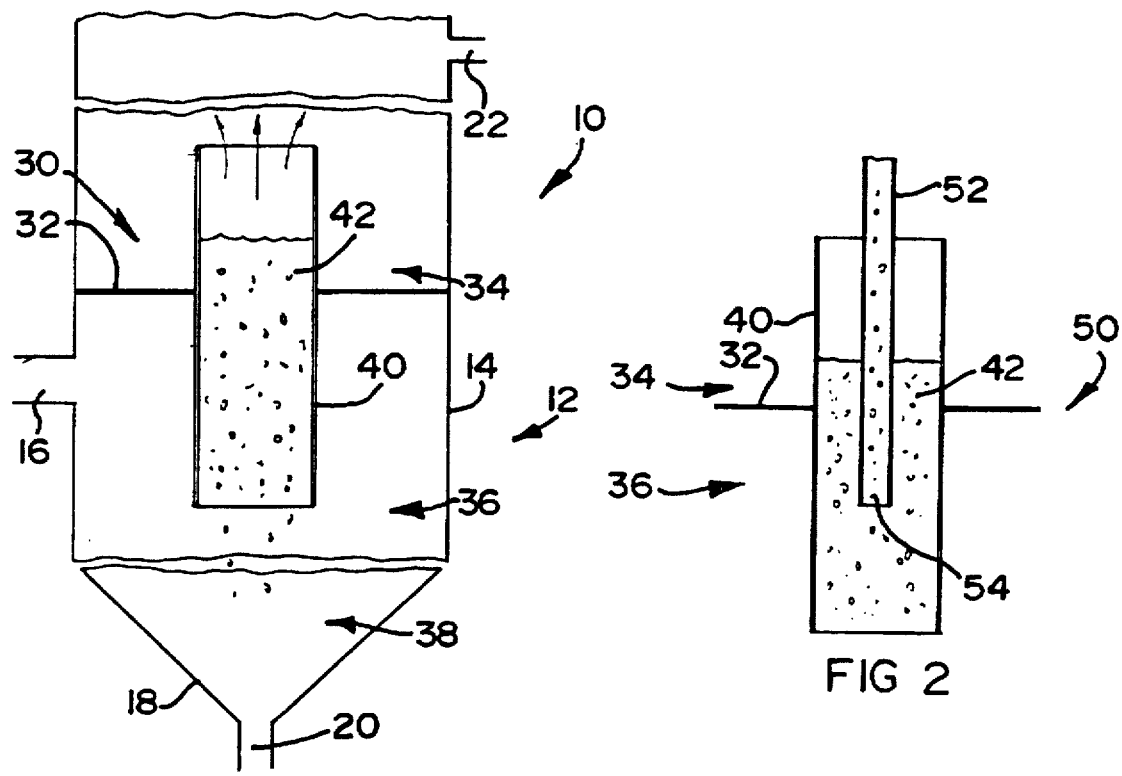
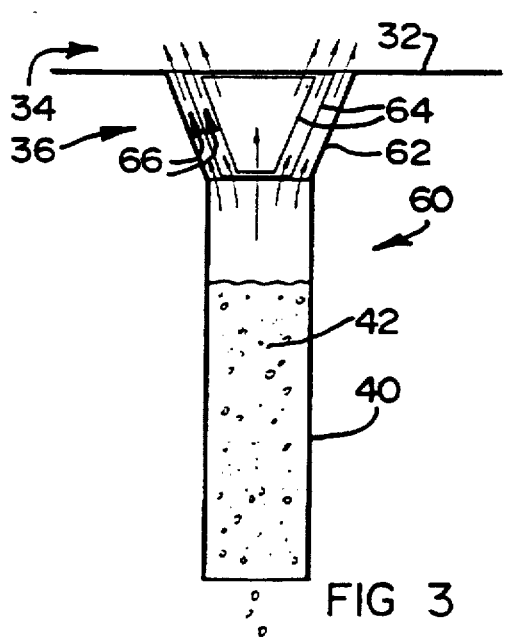
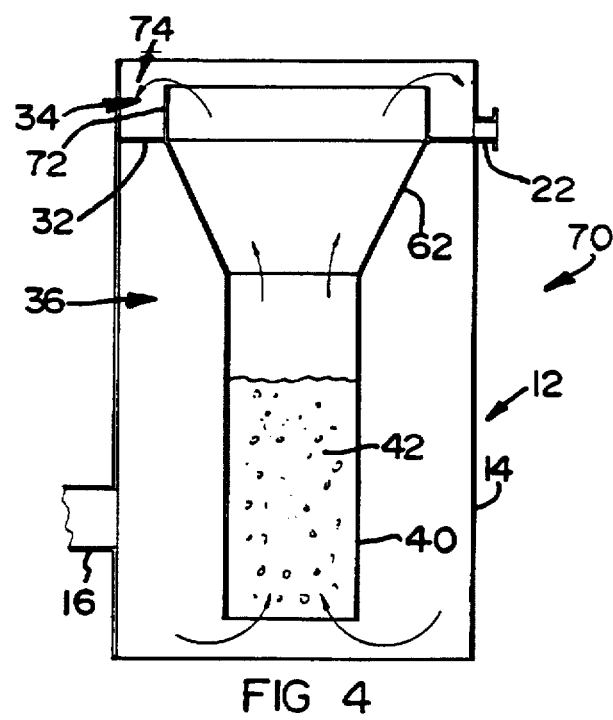

SEPARATION OF A SUSPENSION INTO ITS COMPONENT PARTS

THIS INVENTION relates to the separation of a suspension into its component parts. It relates in particular to a method of, and separating apparatus for, separating particulate material from a carrier fluid in which it is suspended. It relates also to clarifying means.

According to a first aspect of the invention, there is provided a method of separating particulate material from a carrier fluid in which it is suspended, which method comprises separating a first zone of a body of the carrier fluid from a second clarified fluid zone thereof;

feeding a suspension of particulate material in carrier fluid into the body of fluid;

withdrawing clarified fluid from the clarified fluid zone;

allowing substantially all the clarified fluid which enters the clarified fluid zone to pass from the first zone to the second zone through a sub-zone in which at least some separation of particulate material from carrier fluid, against the direction of flow, takes place, with the sub-zone being of smaller cross-sectional area than the body of fluid.

In one embodiment of the invention, the first zone may be a feed zone, with the feeding of the suspension being into the feed zone. However, in another embodiment of the invention, the first zone may be a settling zone, with the feeding of the suspension being effected directly into the sub-zone.

In particular, the particulate material may have a higher density than the carrier fluid so that the clarified fluid zone is located at a high level in the body of fluid, while separated particulate material settles at the bottom of the body of fluid in the or a settling zone.

It is envisaged that the fluid will normally be a liquid. The carrier liquid can then be water, while the particulate material can be soil, sand, gravel, colloidal particles or the like. The method can thus be used to separate a suspension of soil, sand and gravel particles in water into a slurry and clarified water. In particular, the feed suspension may be turbid underground water from mines, or the like.

The separation of the zones from each other may be effected by locating a fluid impervious or impermeable, eg a solid, barrier between the zones.

The sub-zone may be provided by a fluid passageway through the barrier.

According to a second aspect of the invention, there is provided separating apparatus for separating particulate material from a carrier fluid in which it is suspended, which apparatus comprises a vessel adapted to contain a body of carrier fluid;

a barrier separating the vessel into a first zone and a clarified fluid zone and preventing the passage of fluid from the first zone to the clarified fluid zone;

feed means for feeding a suspension of particulate material suspended in carrier fluid, into the vessel;

withdrawal means for withdrawing clarified fluid from the clarified fluid zone;

at least one clarifying member providing a passageway for passage of fluid from the first zone to the clarified fluid zone, the clarifying member also being adapted so that at least some separation of particulate material from carrier fluid takes place therein, and with the cross-sectional area of the passageway being less than that of the vessel.

The barrier and the clarifying member thus constitute clarifying means in the vessel. The vessel may be in the form of a gravity settler, clarifier or thickener. A settling zone may be provided below the clarifying member.

As mentioned hereinbefore, the first zone may be a feed zone, in which case the feed means may include a fitting leading into the vessel. However, instead, the first zone may be a settling zone. The feed means may then include a conduit leading into the clarifying member so that feed suspension is fed directly into the clarifying member.

The clarifying member may comprise an upright open ended cylinder, which may be of substantially constant cross-sectional area or dimension along a major portion of its length, or along its entire length.

Normally, more than one clarifying member, ie more than one cylinder will be used, with each connecting the first zone to the second zone. The cylinders may be of any desired cross-sectional shape, eg circular, square, hexagonal or any other regular or irregular cross-sectional shape. The lengths of the cylinders will generally be greater than their diameters or representative cross-sectional dimensions. Generally, their lengths will be from 2-8 times their diameters or representative cross-sectional dimensions. In particular, the cylinders may be located such that their longitudinal axes extend vertically.

Without wishing to be bound by theory, the Applicant believes that energy must be applied to a suspension to cause collision between solid particles suspended therein, by means of ortho-kinetic flocculation. With sufficient energy input, the particles collide and remain joined together, gradually growing in size, density and settling velocity until the resultant agglomerations of particles, ie flocs, separate by gravity from the carrier liquid, ie separate against the direction of flow. If, however, too little energy is applied, then there is the risk of the particles not approaching each other sufficiently closely to overcome any remaining repulsive charges between the particles. Furthermore, in the event of too much energy being applied, the flocs can be broken up.

In the method and apparatus of the present invention, the solids in suspension, on entering the cylinders, are in the form of discrete particles or small flocs.

Since these have relatively low settling velocities, they will largely be carried upwardly by the flow of suspension entering or passing through the cylinders. Inside the cylinders, the movement of the liquid past the flocs imparts energy to the flocs through the shear forces acting on the flocs. This results in a drop in pressure in the liquid as it passes upwardly through the cylinders.

This pressure drop multiplied by the cross-sectional area of the cylinders, can be equated by the submerged mass of the suspended solids multiplied by 'g', the acceleration constant due to gravity. This force, multiplied by the upward velocity of the liquid in the cylinders, represents the ortho-kinetic energy input into the suspension, per kg of solids in the feed suspension.

Repeated collisions between particles and flocs cause the flocs to increase in size and, under the correct conditions, in density. These large flocs have higher settling velocities so that they slow down in the upflow conditions present in the cylinders. Eventually, they become sufficiently large and dense to drop down against the flow, ultimately to pass from the lower open ends of the cylinders into the settling zone of the body of liquid.

It has been found that, in spite of the random particle motion within the cylinders, a floc bed is formed inside the cylinders, with a distinct top surface. Above this surface, the clarified liquid is almost free of suspended solids, while below the surface, the solids are fairly uniformly distributed but subject to random motion until the flocs become sufficiently large and dense to drop from the lower ends of the cylinders.

An increase in flow rate causes an increase in the height of the floc bed, and an increase in the ortho-kinetic energy input. This increase in the energy input combined with the greater depth of the floc bed, results in the formation of large flocs with settling velocities sufficiently high to enable them to exit from the lower ends of the cylinders.

A higher feed suspended solids concentration requires a greater pressure drop across the cylinders, a higher orthokinetic energy input and more rapid floc formation and withdrawal rate, to balance the increased solids feed rate.

During start-up, and particularly if the concentration of suspended solids in the feed suspension is low, the floc beds may form slowly, and the floc volume concentration, ie the volume of the flocs in the floc beds as a proportion of the volume of the floc beds, may be low. Under these conditions the ortho-kinetic energy input will also be low, since it is a function of the mass of suspended solids in the floc bed inside the clarifying cylinders.

Without well formed floc beds, the motion of the liquid through the clarifying cylinders is generally laminar or transitional, ie between laminar and turbulent flow, and the drop in pressure in the liquid as it passes upwardly through the cylinders is very low at normal design flow rates.

To overcome this problem and to provide sufficient energy for ortho-kinetic flocculation under start-up conditions, the flow of liquid entering or within the clarifying cylinders can be slightly disturbed so as to create localised or general turbulence. This can be accomplished by using a mechanical stirrer or other means of agitation in the clarifying cylinders, or more simply by adapting the clarifying cylinders, eg by modifying the shape of the clarifying cylinders. Such modification may, for example, comprise an inwardly flaring peripheral lip at the lower ends of the cylinders, so that the cylinders have a reduced inlet area.

Instead, the clarifying cylinders may have one or more 'steps' along their length at which their effective cross-sectional area changes, ie increases. Each step or change in cross-section causes a local increase in turbulence and provides energy for ortho-kinetic flocculation. The increase in cross-sectional area through successive sections of the clarifying cylinders means a lower average upflow velocity away from each area of turbulence. Each decrease in upflow velocity provides a safety barrier since flocs are much less likely to be carried upwardly through a region of low upflow velocity than through a region in which the upflow velocity is high enough to support a fully developed floc bed undergoing ortho-kinetic flocculation.

Due to the cylinders being of substantially constant cross-sectional dimension, a steady yet random motion within the floc beds in the cylinders and maintenance of an even upper surface of the floc beds, are achieved. This minimizes breakthrough of flocs into the clarified liquid above the floc beds.

The method may include, if necessary, adding a coagulant/flocculant to the feed suspension to destabilize it, thereby to promote floc formation.

If desired, the upper end of each cylinder above the floc bed level may flare outwardly to provide a flared portion at the upper end of the cylinder, or an outwardly flaring component may be attached to the upper end of the cylinder. In use, this results in a decrease in the liquid average upflow velocity, but an increase in turbulence and hence the opportunity for more interparticle collisions. Both effects contribute to preventing small flocs from exiting into the clarified liquid.

If further desired, inclined separating surfaces may be located in the flared portions of the cylinders or in the flared components. Laminar or near laminar flow conditions can then be maintained along the flow paths defined between adjacent separating surfaces. Fine residual flocs settle out against the inclined separating surfaces, and slide back into the cylinders, to be incorporated into newly formed flocs.

The clarifying cylinders can thus operate over a wide range of feed flow rates and concentrations. However, at very high feed flow rates, the high upflow velocity in the cylinders can cause carry over of individual flocs. To reduce the likelihood of this happening and to increase the stability of the floc bed at high feed rates, an automatic bypass can be provided.

The principle of this is that, at low flow rates, there are few flocs inside the clarifying cylinders, the floc beds are poorly formed and the resistance to flow upwardly through the cylinders is negligible; at higher flow rates the floc beds increase in depth and floc volume concentration and the flow resistance increases in line with the mass of solids to be supported.

The apparatus may include bypass means providing a liquid bypass around the or each cylinder. Such bypasses have a relatively high, but constant resistance. Thus, at low feed flow rates, nearly all the flow will pass through the cylinders; however, with increasing feed flow rates, more and more of the additional flow will pass through the bypasses. This effectively stabilises the floc beds.

The bypass means may comprise apertures in the sides of the clarifying cylinders, but care must be taken to ensure that any suspension bypassed is either clear or can be clarified subsequently.

The settling zone may comprise an upper free settling region in which free settling of solid particles through the liquid body takes place, a hindered settling region below the free settling sub-region in which hindered settling of particles or flocs takes place, and a compaction region below the hindered settling region in which the solid particles or flocs are in contact with one another so that a slurry is formed in this region. The method may then include allowing liquid, in at least the compaction region, to move upwardly along at least one upwardly inclined pathway, while at least partially protected from settling solid particles, and withdrawing slurry from the compaction region. The upwardly inclined pathway may be provided by a static inclined surface, which may form part of a separation device as described in "U.S. Pat. No. 5,433,862 and U.S. Pat. No. 5,549,827, which are incorporated herein by reference, " located in the vessel.

While the fluid will, as stated hereinbefore, normally be a liquid such as water, it is believed that the separating apparatus according to the invention can also be used for the separation of particulate matter and liquids from gases.

In the scrubbing of particulate material from a gaseous emission from a furnace or boiler, use can be made of a fine spray of water to effect agglomeration of the particles which will then separate out from the gases within the separating cylinders. Apparatus. according to the invention can thus be used to replace bag filters, scrubbers and electrostatic precipitators.

The apparatus may also be used for the demisting, ie the removal of fine liquid particles or globules from gas streams.

According to a third aspect of the invention, there is provided clarifying means comprising a fluid impermeable barrier locatable in a vessel and adapted to separate the vessel into a first zone and clarified liquid zone; and at least one clarifying member providing a passageway for liquid through the barrier, the clarifying member adapted so that, in use, at least some separation of particulate material from carrier liquid, on a suspension of the particulate material in the carrier liquid entering it, takes place, with the cross-sectional area of the passageway being less than the area of the barrier.

The invention will now be described by way of example with reference to the accompanying diagrammatic drawings.

In the drawings,

FIG. 1 shows a longitudinal sectional view of separating apparatus according to a first embodiment of the invention;

FIG. 2 shows a longitudinal sectional view of part of separating apparatus according to a second embodiment of the invention;

FIG. 3 shows a longitudinal sectional view of part of separating apparatus according to a third embodiment of the invention;

FIG. 4 shows a longitudinal sectional view of separating apparatus according to a fourth embodiment of the invention;

In the drawings, similar parts are indicated with the same reference numerals.

Figure 5:
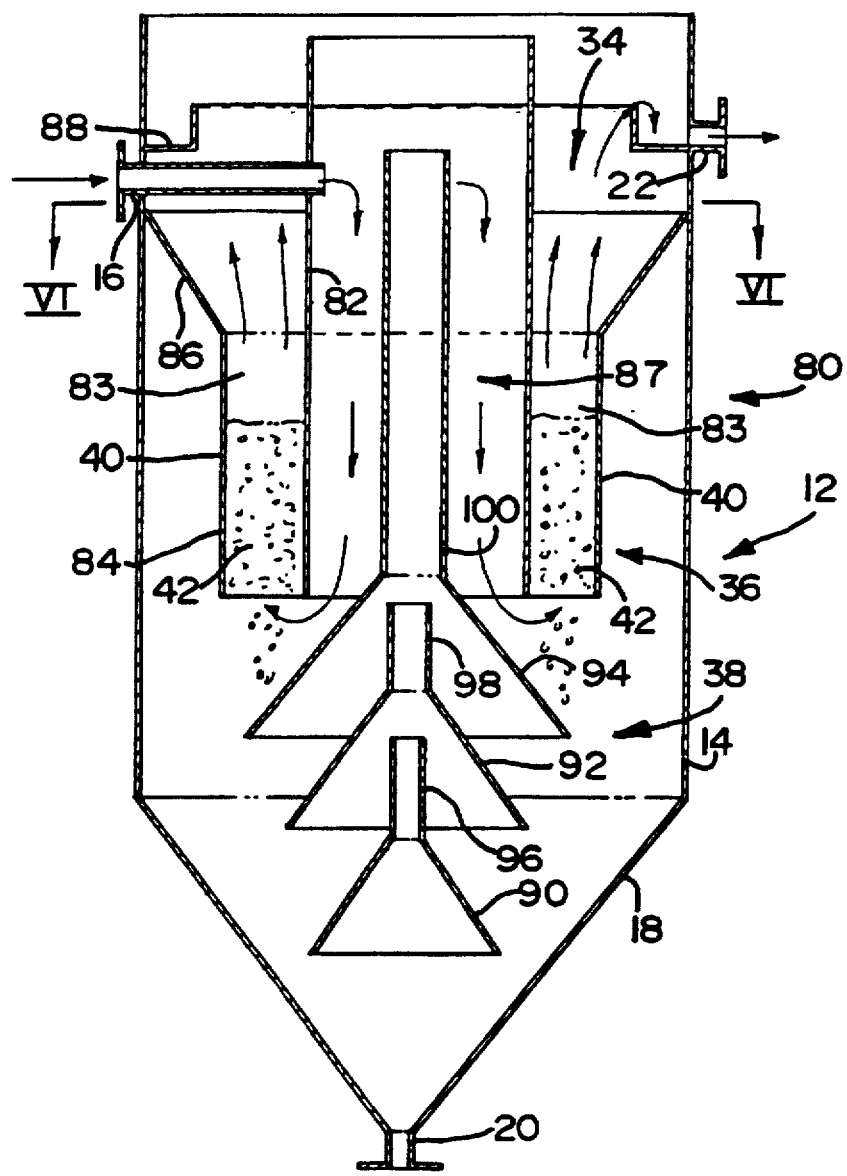
FIG. 5 shows a longitudinal sectional view of separating apparatus according to a fifth embodiment of the invention.

Referring to FIG. 1, reference numeral 10 generally indicates separating apparatus according to a first embodiment of the invention.

The apparatus 10 includes a gravity settling vessel, generally indicated by reference numeral 12. The vessel 12 comprises a cylindrical wall 14, with a suspension feed inlet 16 provided in the wall 14. At the lower end of the wall 14 is provided an inverted conical portion 18 fitted with a slurry outlet 20 at its apex. At the upper end of the wall 14 is provided a clarified liquid outlet 22.

The apparatus 10 also includes clarifying means, generally indicated by reference numeral 30.

The clarifying means 30 includes an impermeable or solid barrier 32 spanning the wall 14 and separating it into an upper clarified liquid zone 34, and a lower zone 36. In this case, the lower zone 36 is a feed zone, with the inlet 16 leading into the zone 36. A settling region 38 is provided by the inverted conical portion 18.

The clarifying means 30 also includes an open-ended circular section clarifying cylinder 40 of constant diameter extending through the barrier 32. The clarifying cylinder 40 thus extends vertically.

In use, a suspension of solid particulate material, eg soil, sand or gravel particles, in a carrier liquid, eg water, enters the vessel 12 through the inlet 16. The vessel 12 is filled with a body of the carrier liquid. Substantially all liquid, in order to move from the feed zone 36 to the clarified liquid zone 34, must pass vertically upwardly through the clarifying cylinder 40. Flocs form within the clarifying cylinder 40 by means of ortho-kinetic flocculation as hereinbefore described, and form a floc bed 42. The upper surface of the floc bed 42 is below the upper end of the cylinder 40. The flocs increase in size and density until their settling velocities exceed the upflow feed velocity. Thus, separation against the direction of flow of liquid takes place. They then drop through the lower end of the cylinder 40, into the settling zone 38, with a slurry being withdrawn through the slurry outlet 20. Clarified liquid is naturally withdrawn through the outlet 22.

The clarifying cylinder 40 is sized so that at the maximum design feed flow rate, the upward velocity of the liquid through the cylinder is such that the floc bed 42 occupies substantially the whole of cylinder 40.

Referring to FIG. 2, reference numeral 50 generally indicates settling apparatus according to a second embodiment of the invention.

In the settling apparatus 50, the suspension feed inlet 16 in the wall 14 is dispensed with, with the lower zone 36 forming part of a settling zone located below the barrier 32. A suspension feed conduit 52 leads co-axially into the clarifying cylinder 40, with its outlet opening 54 being downwardly directed and being located in the lower portion of the clarifying cylinder 40.

In the apparatus 50, the floc bed 42 is again formed in the cylinder, by means of ortho-kinetic flocculation.

It is believed that the separation apparatus 50 can be used when the suspension feed contains large or heavy solid particles which would tend to settle out directly in the feed zone, without being drawn into the cylinder 40, if introduced into zone 36 immediately below the barrier 32. By utilizing the feed conduit 52, such large or heavy particles will more readily partake in floc formation, thereby assisting in the settling and separation of smaller and lighter particles.

In other embodiments (not shown), the feed conduit 52 may enter through the lower end of the cylinder 40, with its outlet 54 being upwardly directed, or may extend at any desired angle through the wall of the cylinder 40.

Referring to FIG. 3, reference numeral 60 generally indicates separating apparatus according to a third embodiment of the invention.

In the apparatus 60, the upper end of the cylinder 40 is located below the barrier 32, with a flared component 62 extending from the upper end of the cylinder 40 to the barrier 32. The component 62 flares outwardly upwardly, and is thus of inverted frusto-conical shape. A plurality of inverted open-ended frusto-conical separating members 64 are located within the portion 62, with liquid passageways 66 being defined between the separating members 64. The separating members 64 thus provide parallel separating surfaces between which upwardly passing clarified liquid must flow. Liquid flow between these surfaces is laminar or close to laminar. Any residual solids in the clarified liquid thus have an opportunity to settle out on the extended separating surfaces provided by the members 64, and can fall back into the floc bed 42.

In this version of the invention, the suspension feed enters through the suspension feed inlet 16, with the zone 36 thus being a feed zone.

Referring to FIG. 4, reference numeral 70 generally indicates separating apparatus according to a fourth embodiment of the invention.

In the apparatus 70, the barrier 32 is located close to the upper end of the vessel 12, and the frusto-conical portion 62 terminates in the barrier 32. A wall 72 is provided along the periphery of the upper end of the portion 62, above the barrier 32, so that a clarified liquid well 74 is provided around the wall 72.

If desired, more than one of the cylinders 40 can lead into the same well 74.

Due to the flared component 62, the average upflow velocity of the clarified liquid is reduced to inhibit escape of small residual flocs of particles. In other words, in view of the lower upward liquid velocity in the portion 62, such small particles have a greater chance of separating out from the liquid. In addition, the reduction in liquid velocity in the portion 62 also results in the formation of eddy currents within the portion 62, which may result in additional ortho-kinetic flocculation.

It is believed that existing clarifiers, settlers or thickeners can readily be upgraded to function in accordance with the present invention by installing therein clarifying means comprising the barrier 32, cylinder 40 and flared portion 62 of this embodiment of the separating apparatus.

TEST NO. 1

A test was conducted on apparatus substantially as shown in FIG. 4, and having the following dimensions:

Diameter of the vessel 12 —477 mm
Height of the vessel 12 —4200 mm
Diameter of the clarifying cylinder 40 —300 mm
Length of the clarifying cylinder 40 —900 mm
Suspended solids concentration in the feed —500–800 ppm Water containing fine particles of nickel sulphide in suspension was fed by gravity through the conduit 16 at flow rates between 100 and 2000 λ/h. An anionic polyacrylamide was used as a flocculant.

Flocs formed within the cylinder 40. At low flow rates most of the flocculated nickel sulphide solids dropped directly into the lower conical section of the vessel. At higher flow rates a distinct floc bed 42 formed within the cylinder 40. The higher the flow rate, the deeper the floc bed. At maximum flow rate the floc bed expanded into the conical section 62 where the increased turbulence resulted in further ortho-kinetic flocculation occurring. Throughout the entire test run the clarity of the water exiting the frusto-conical portion 62 of the clarifying cylinder was good. Underflow relative densities up to 2.28 were obtained.

Figure 6:
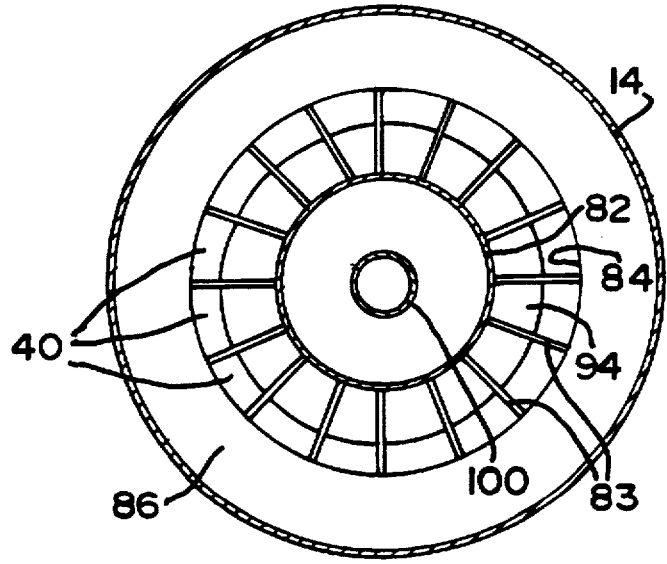
FIG. 6 shows a sectional view through VI—VI in FIG. 5.

Referring to FIGS. 5 and 6, reference numeral 80 generally indicates separating apparatus according to a fifth embodiment of the invention.

The apparatus 80 includes two co-axially located cylindrical members 82 and 84, with a plurality of clarifying cylinders 40 formed between cylindrical members 82 and 84 by radial barriers 83. An annular member 86 flares upwardly outwardly from the member 84 to the wall 14 of the vessel 12.

Thus, the components 84 and 86 together constitute a barrier separating the zone 36 from the clarified liquid zone 34, while the component 82 constitutes a barrier separating a feed zone 87 from the zone 34.

The inlet 16 extends into the inside of the cylindrical member 82, above the flared member 86, ie into the feed zone 87.

An annular well 88 extends around the inside of the wall 14 at the level of the outlet 22, with the upper end of the cylindrical member 82 being located above the level of the well 88.

A plurality of hollow open-ended conical separating members 90, 92 and 94, spaced apart from one another with the apex of the one separating member located within the skirt of an adjacent separating member and located co-axially in the vessel 12 are also provided. These members may increase in size from the separating member 90 which is located the lowest and which may be the smallest to the separating member 94 which may be the largest and located uppermost. A conduit 96 leads from the apex of the separating member 90 into the skirt of the separating member 92, with a conduit 98 leading from the apex of the separating member 92 into the skirt of the separating member 94. A conduit 100 leads from the apex of the separating member 94 up the cylindrical member 82, with its upper end terminating near the level of the inlet 16. Thus, the separating members 90, 92 and 94 may be similar to those described in "U.S. Pat. No. 5,433,862 and U.S. Pat. No. 5,549,827, which are incorporated herein by reference". In the apparatus 80, clarified liquid exiting the cylinders 40 passes through the flared portion 86 which again lowers the upward velocity thereof, thereby enhancing small particle settling as hereinbefore described.

It is believed that the separating members 90, 92 and 94 will be used when the suspension feed consists of a thick slurry, or when a high under flow or slurry density is required. The separating members 90, 92, 94 can thus be dispensed with if desired.

TEST NO. 2

A test run was conducted on apparatus substantially as shown in FIG. 5, and having the following dimensions:

Diameter of vessel 12 —2200 mm
Overall height of vessel 12 —5900 mm
Number of Cylinders 40 —8
Effective size of cylinders 40 —500 mm
Overall length of cylinders 40 —1950 mm
Number of dewatering cones 90, 92, 94 —5

Scrubber water containing Kimberlite ore was fed by pump through conduit 16 into the apparatus. A combination of a cationic coagulant and an anionic flocculant was used to destabilise and aggregate the solids in suspension. The feed flow rate was 150 m$^3$/h, at a relative density of 1.05 and with a solids S.G. of 2.35. The overflow generally was very clear.

Underflow relative densities in excess of 1.3 were easily obtained.

Figure 7:
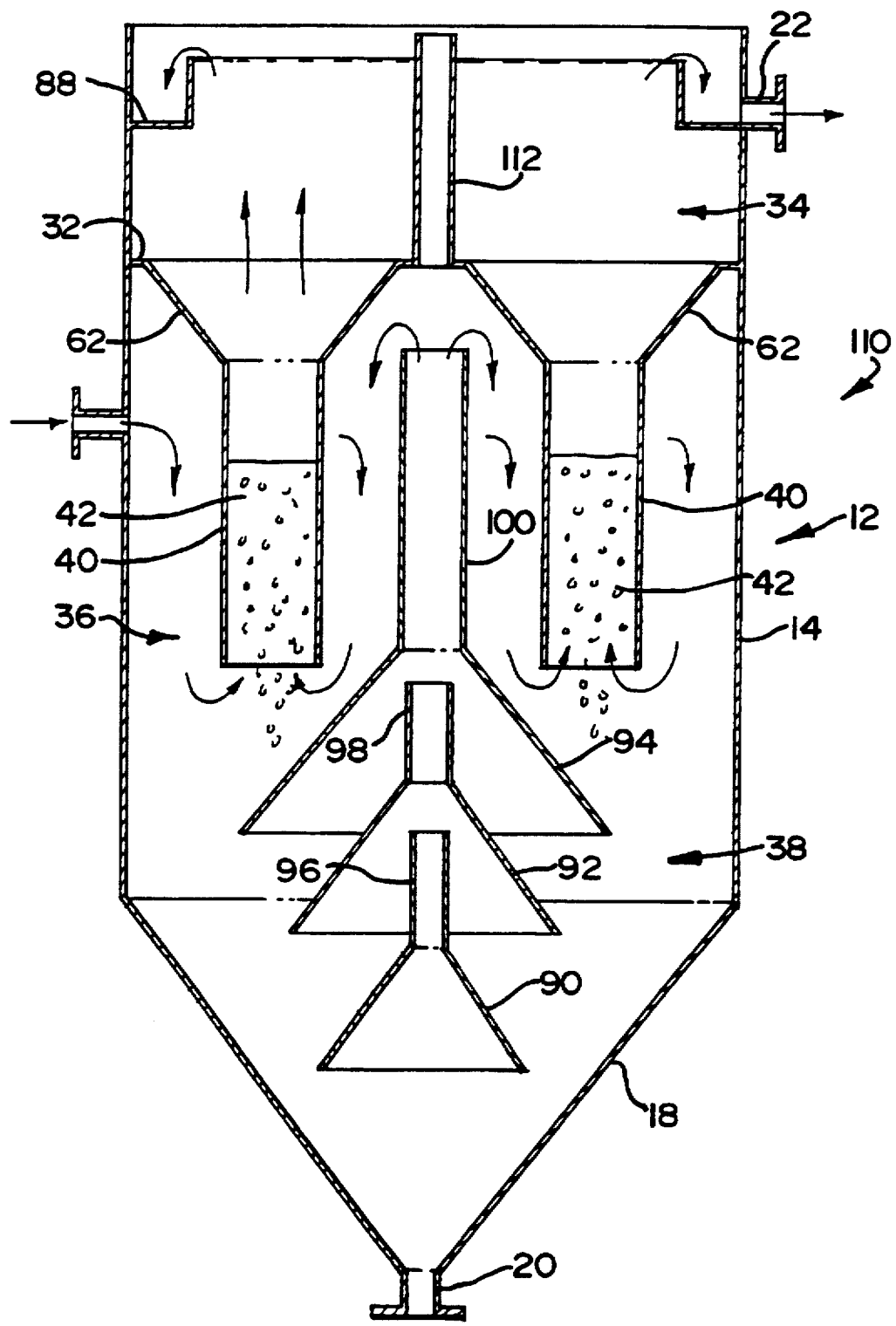
FIG. 7 shows a longitudinal sectional view of separating apparatus according to a sixth embodiment of the invention.

Referring to FIG. 7, reference numeral 110 generally indicates separating apparatus according to another embodiment of the invention.

The separating apparatus 110 is similar to the separating apparatus 80 of FIGS. 5 and 6 except that the suspension feed inlet 16 leads into the cylindrical wall 14 and not into a central cylindrical member. Thus, the zone 36 is a feed zone.

Furthermore, the upper ends of the cylinders 40 are provided with the flared portions 62 which terminate in the barrier 32. An air vent conduit 112 leads upwardly from the centre of the barrier 32 to above the well 88.

Figure 8:
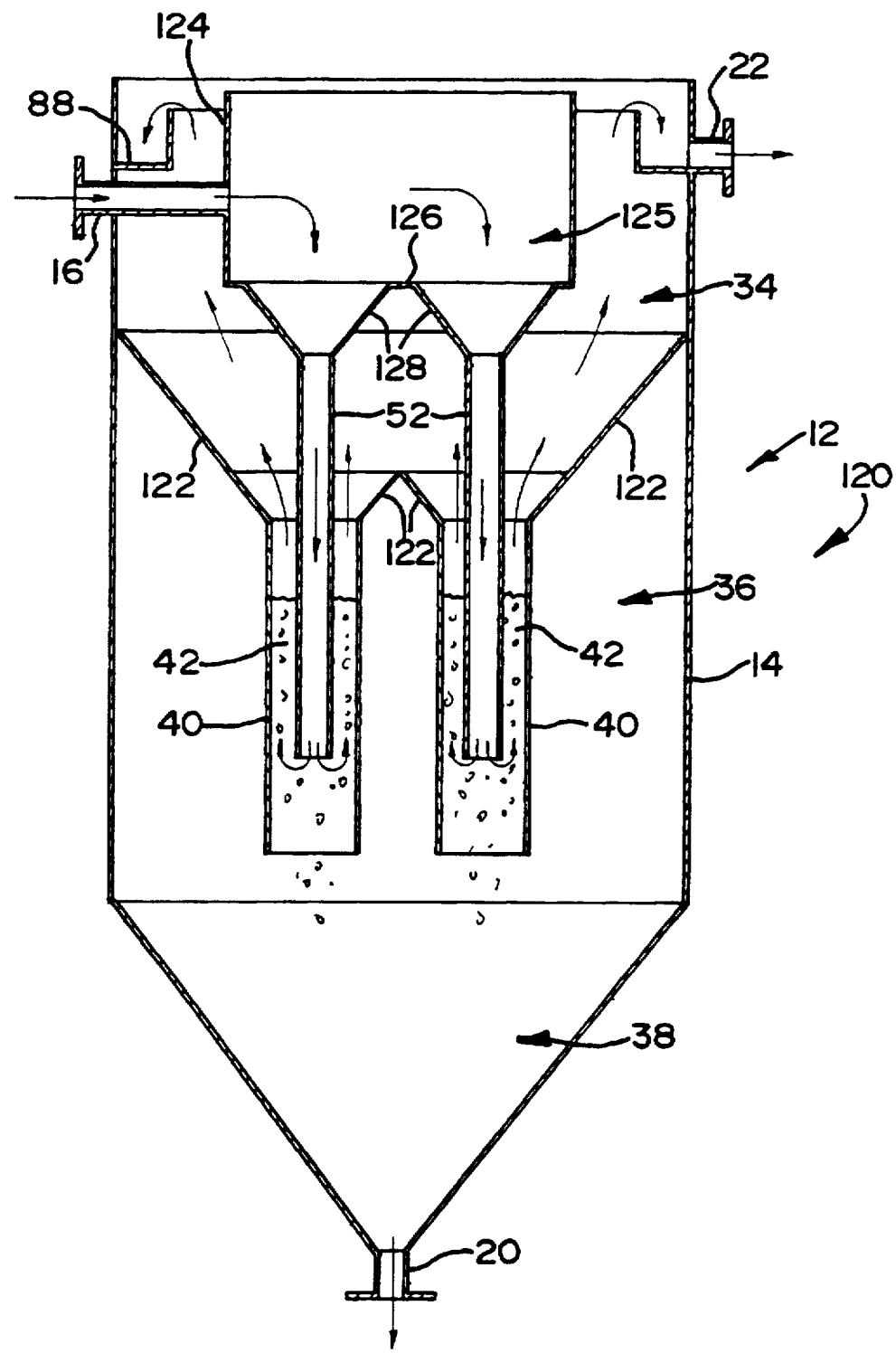
FIG. 8 shows a longitudinal sectional view of separating apparatus according to a seventh embodiment of the invention.

Referring to FIG. 8, reference numeral 120 generally indicates clarifying apparatus according to a seventh embodiment of the invention.

In the separating apparatus 120, a plurality of separating cylinders 40, located circumferentially apart, are provided. The upper ends of the cylinders 40 are connected to each other as well as to the wall 14 by means of a flared component 122, with the flared component 122 thus also constituting the barrier between the zones 34, 36.

The apparatus 120 also includes a cylindrical member 124 located above the cylinders 40 and providing a feed zone 125, with the feed inlet 16 leading through the wall 14 into the cylindrical member 124. The upper end of the cylindrical member 124 is located above the level of the well 88, while its lower end is closed off with a floor 126. In the floor 126 is provided an inverted frusto-conical component 128 for each of the cylinders 40, with a feed conduit 52 leading from the apex of each of the components 128 into each associated cylinder 40.

Thus, the cylindrical member 124, its floor 126, feed conduits 52 and the components 128 constitute a barrier between the zones 125 and 34, whilst the flared component 122 constitutes a barrier between zones 36 and 34. Thus, substantially all suspension entering the apparatus 12 has to pass through the clarifying cylinders 40.

In the apparatus 120, large and heavy solid particles in the suspension feed cannot settle out directly, and thus partake in flocculation with lighter solid fractions, within the cylinders 40. Thus, high separating efficiencies are obtained, allowing the apparatus 120 to work at high flow rates and reduced overflow or clarified liquid suspended solid levels.

The change in liquid velocity as the suspension leaves the feed conduits 52 and enters into the clarifying cylinders 40, provides sufficient turbulence for start-up flocculation.

Figure 9:
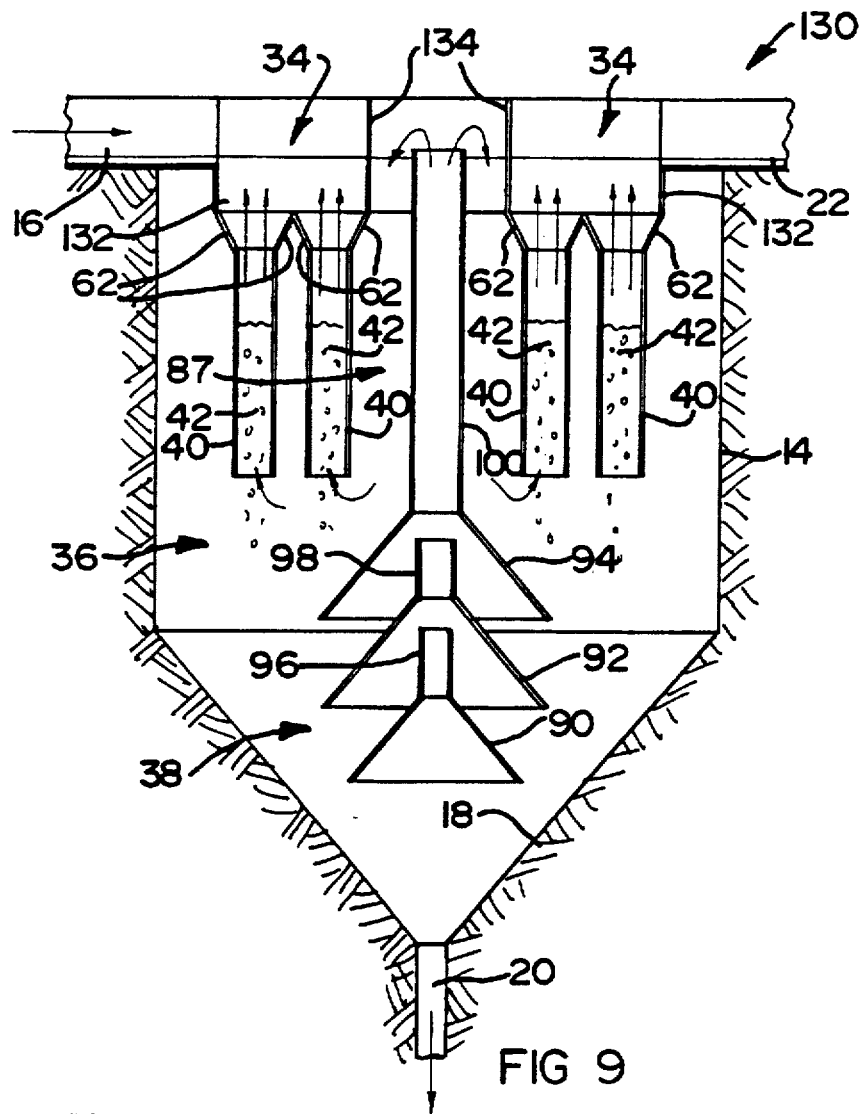
FIG. 9 shows a longitudinal sectional view of separating apparatus according to a eighth embodiment of the invention.
Figure 10:
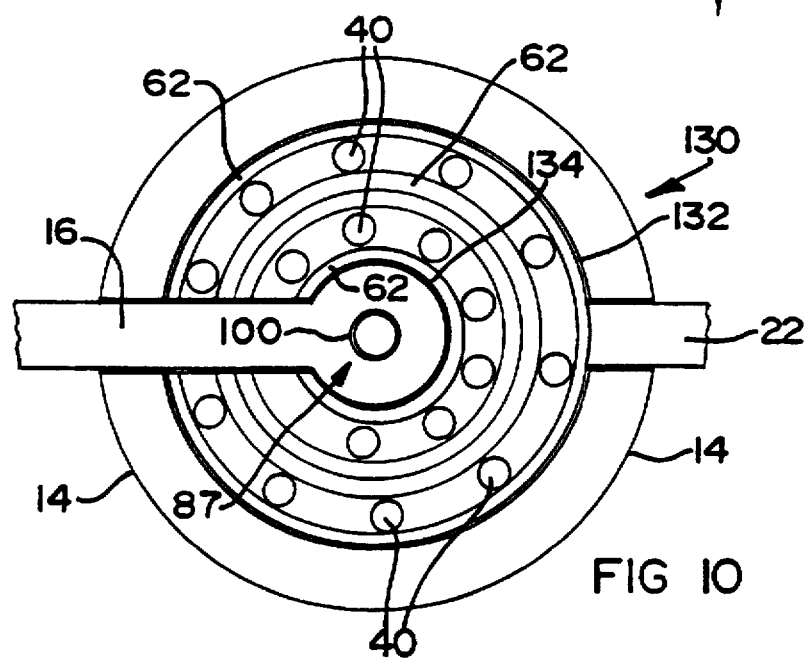
FIG. 10 shows a plan view of the separating apparatus of FIG. 9.

Referring to FIGS. 9 and 10, reference numeral 130 generally indicates separating apparatus according to a eighth embodiment of the invention.

The apparatus 130 is shown in the form of an underground clarifier/thickener, with the inlet 16 leading into the vessel 12 at a high level.

The apparatus 130 includes a plurality of clarifying cylinders 40 located in two concentric rings, with the cylinders 40 in each ring of cylinders being spaced circumferentially apart. The upper ends of the cylinders 40 are provided with flared portions 62, with the flared portions 62 being attached to cylindrical walls 132, 134 located concentrically with respect to each other. The zone 34 is thus provided between the walls 132, 134, with the outlet 22 leading from the wall 132. The inlet 16 leads through the walls 132, 134 so that the feed zone 87 is located at the centre of the apparatus 130.

Thus, the components 62 and walls 132, 134 constitute barriers between the zones 34 and 87.

The apparatus 130 can thus be provided underground, eg by a suitable excavation in rock, with the various components then being locatable readily in the excavation. Thus, for example, the separating members 90, 92, 94 may be provided with suitable brackets or the like to permit them merely to be located in position in the excavation. The same will apply as regards the walls 132 and cylinders 40.

Figures 11, 12:
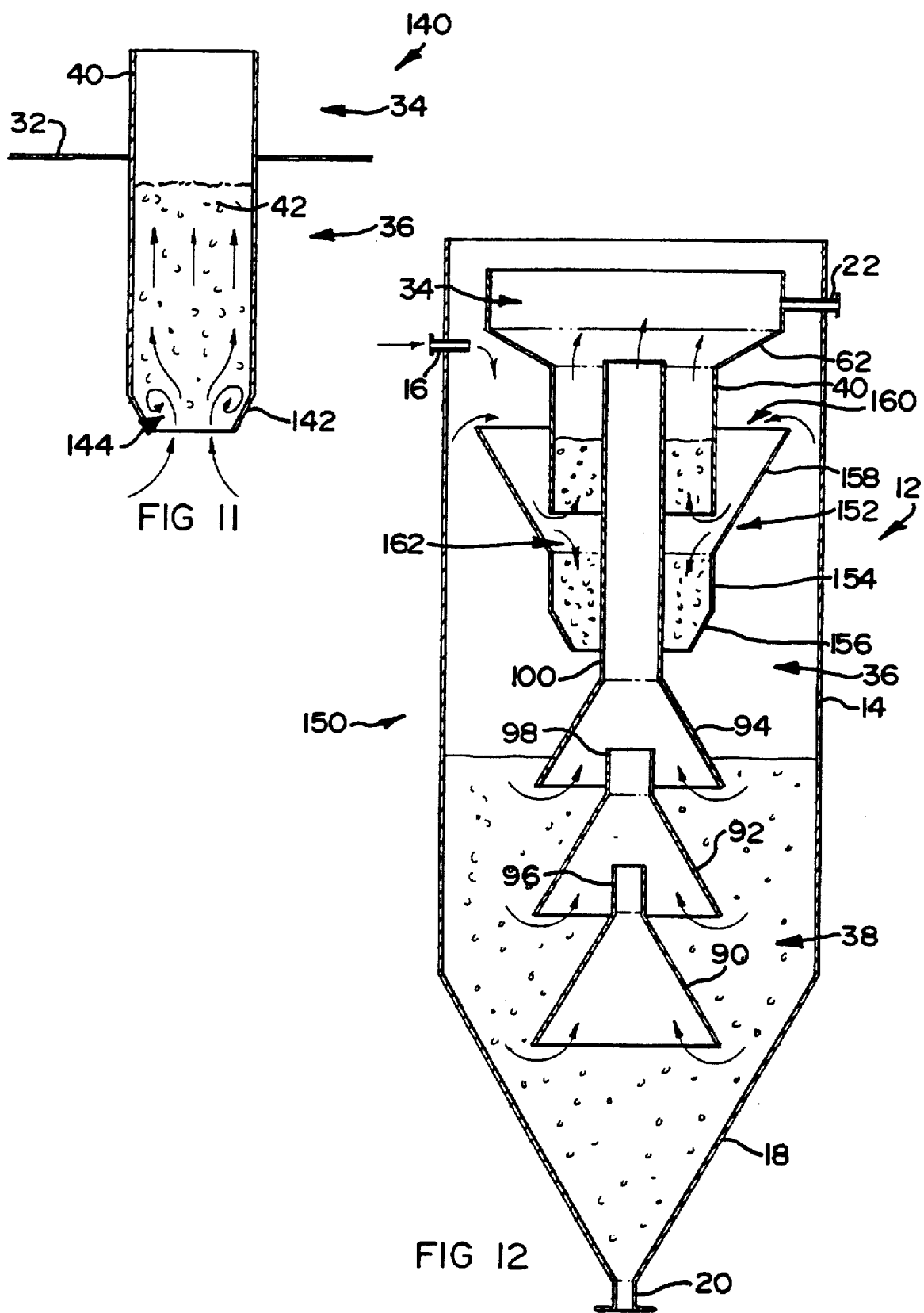
FIG. 11 shows a longitudinal sectional view of part of separating apparatus according to a ninth embodiment of the invention.
FIG. 12 shows a longitudinal sectional view of separating apparatus according to a tenth embodiment of the invention.

Referring to FIG. 11, reference numeral 140 generally indicates separating apparatus according to a ninth embodiment of the invention.

A radially inwardly directed inlet lip 142 formed at the lower end of the cylinder 40 from a short inverted hollow truncated conical section 142, causes turbulence in a zone 144 provided by the lip as the flow lines diverge inside the cylinder 40. The energy loss in this turbulence is sufficient to provide for start-up ortho-kinetic flocculation.

The reduced inlet area of the cylinder 40 can have a second advantage in that the increased vertical flow rate due to smaller internal diameter of the lip 142, induces more and larger particles to be drawn into the clarifying cylinder, thereby increasing the rate at which the floc bed forms.

Referring to FIG. 12, reference numeral 150 shows separating apparatus according to a tenth embodiment of the invention.

The apparatus 150 includes a clarifying cylinder 40 and frusto-conical portion 62, similar to those shown in FIG. 4. It also includes hollow open-ended conical separating members 90, 92 and 94 and their associated conduits 96, 98 and 100 respectively, similar to those shown in FIG. 5. The conduit 100 extends into the cylinder 40.

An inverted hollow frusto-conical member 152 is located around the conduit 100. The member 152 comprises a cylindrical component 154, an inwardly tapering peripheral lip 156 at the lower end of the cylindrical component 154, and a skirt 158 flaring upwardly outwardly from the upper end of the cylindrical component 154. The skirt 158 is located around the cylinder 40 such that an annular opening 160 is defined between the upper edge of the skirt and the cylinder 40. Furthermore, the cylindrical component 154 can be considered to be an extension of the cylinder 40. A feed opening 162 is constituted by the axial spacing between the lower end of the cylinder 40 and the upper end of the cylindrical component 154.

Thus, the feed suspension is fed into the side of the cylinder 40, 154 by means of the feed opening 162, with the suspension passing from the zone 36 of the vessel 12, through the annular opening 160 and then through the feed opening 162. The main flow is directly upwardly into the cylinder 40 and hence the floc bed form rapidly. However, there is also suspension flow vertically downwardly into the cylindrical component 154. This flow is the sum of the underflow which exits through nozzle 20 and the bypass water which passes through the lip 156 and up through dewatering conduit 100. The conduit 100 thus provides a bypass around the floc bed in the cylinder 40. The conduit 100 can be sized to restrict the flow through this bypass.

Water for diluting the feed and improving flocculation gathers on the underside of the skirt 158, and thereafter mixes with the feed inside the member 152.

A degree of flocculation takes place inside the cylindrical component 154 due to turbulence. Flocs exiting the lip 156 are therefore well formed and result in high underflow densities.

Suspension bypassing the cylinder 40 through dewatering conduit 100 is low in solids, since flocculation also takes place inside the conduit 100. The low velocity inside chamber 62 results in a further separation before the clarified water exits through nozzle 22.

Instead of a single clarifying cylinder, the annular space between the dewatering conduit 100 and the cylinder 40, 154 can be converted into a plurality of clarifying cylinders by means of radial barriers (not shown) similar to the radial barriers 83 in FIGS. 5 and 6.

It is believed that the separating apparatus according to the invention, apart from being relatively easy to design in the sense that the clarifying cylinders are of constant cross-sectional dimension so that they need merely be sized to ensure that the upward velocity of the liquid is such that flocs of a desired size can settle out, also have the following advantages:

- they can operate over a wide range of flow rates, from very high to very low flow rates, at high separation efficiencies
- they can operate over a wide range of feed suspended solid concentrations
- they can operate with low flocculant dosage rates, irrespective of whether or not the feed is a low turbidity feed or slurry
- they have very short start-up times before full operating floc beds are developed in the cylinders 40
- they are substantially self-cleaning during shut-down they have no moving parts they have very low erosion rates since the lower ends of the cylinders 40 are generally not tapered or restricted, blockages are substantially eliminated. This is of particular importance when the feed contains large solids, or when the flocs can become large and sticky, such as is due to overdosing of flocculants the average upflow velocity in the clarifying cylinders can be calculated directly from the difference between the feed flow rate, and the underflow or slurry withdrawal rate since all the liquid overflowing the apparatus flows through the cylinders. This applies even when the apparatus incorporates the dewatering or separating members in accordance with South African Patent No. 93/6167 the flow rate through each clarifying cylinder 40 is automatically equalized at least partially since all the cylinders 40 discharge into a common clarified liquid zone 34. The outlet pressure is thus the same for all the cylinders and all the cylinders are fed from a common feed zone. Thus, the pressure drop across each cylinder must be substantially the same, and the geometry of each cylinder is substantially identical so that losses due to wall friction are the same. Thus, under equilibrium conditions, the head loss in each cylinder by liquid shear on the suspended flocs inside the cylinder must be equal. Since this shear force per unit area can be equated to the pressure due to the submerged mass of solids suspended by the upflowing liquid, the mass of solids within each cylinder must be the same. Assuming thus that the mass of solids within one cylinder becomes less than that within the other cylinders. This implies that there will be a lower pressure drop across that cylinder. However, since the cylinders connect the same zones, this lower pressure drop would result in a higher flow rate into that clarifying cylinder. This increased flow rate will transfer more solids into that cylinder, thereby re-establishing equilibrium.

I claim:

1. A method of separating particulate material from a carrier fluid in which it is suspended, the method comprising feeding a suspension of particulate material in carrier fluid into a first zone of a body of the carrier fluid separated from a second clarified fluid zone thereof located at a high level in the body of carrier fluid by means of a fluid impermeable barrier located between the zones, with the particulate material having a higher density than the carrier fluid;

withdrawing clarified fluid from the clarified fluid zone;

allowing substantially all the clarified fluid which enters the clarified fluid zone to pass from the first zone to the second zone through a vertical fluid passageway of regular or irregular cross-sectional shape, with the fluid passageway being of substantially constant cross-sectional area or dimension along its entire length apart from, optionally, an inwardly flaring peripheral lip at the lower end of the passageway so that the passageway has a reduced inlet area, and/or a portion of increased cross-sectional area or dimension at the upper end of the passageway, with ortho-kinetic flocculation of solid particles taking place in the fluid passageway so that small solid particles are flocculated, in a floc bed within the passageway, into larger flocs having higher settling velocities, with the flocs dropping down against the direction of fluid flow through the floc bed and settling at the bottom of the body of fluid in a settling zone.

2. A method according to claim 1, wherein the first zone is a feed zone, with the feeding of the suspension being into the feed zone.

3. A method according to claim 1, wherein the first zone constitutes the settling zone, with the feeding of the suspension being effected directly into the fluid passageway.

4. Separating apparatus for separating particulate material from a carrier fluid in which it is suspended, wherein the apparatus comprises a vessel for containing a body of carrier fluid;

a fluid impermeable barrier separating the vessel into a first zone and a clarified fluid zone located at a high level in the vessel;

feed means for feeding a suspension of particulate material suspended in carrier fluid, with the particulate material having a higher density than the carrier fluid, into the vessel;

withdrawal means for withdrawing clarified fluid from the clarified fluid zone; and at least one clarifying member providing a vertical fluid passageway of regular or irregular cross-sectional shape, and of substantially constant cross-sectional area or dimension along its entire length apart from, optionally, an inwardly flaring peripheral lip at its lower end so that it has a reduced inlet area, and/or a portion of increased cross-sectional area or dimension at its upper end, for passage of fluid from the first zone to the clarified fluid zone, the clarifying member being dimensioned for ortho-kinetic flocculation of solid particles in a floc bed in the passageway as the suspension passes therethrough, with small solid particles thus flocculating into larger flocs having higher settling velocities and being capable of settling at the bottom of the vessel in a settling zone.

5. Apparatus according to claim 4 wherein the first zone is a feed zone, with the feed means including a fitting leading into the vessel.

6. Apparatus according to claim 4, wherein the first zone is the settling zone, with the feed means including a conduit leading into the clarifying member so that feed suspension is fed directly into the clarifying member.

7. Apparatus according to claim 4, wherein the clarified member comprises an upright open ended cylinder.

8. Apparatus according to claim 7, wherein a plurality of the cylinders, each connecting the first zone to the second zone, is provided, with the lengths of the cylinders being greater than their diameters or representative cross-sectional dimensions.

9. Apparatus according to claim 8, wherein the upper ends of the cylinders flare outwardly to provide flared portions at the upper ends of the cylinders.

10. Apparatus according to claim 9, wherein inclined separating surfaces, located in the flared portions of the cylinders, are provided.

11. Apparatus according to claim 8, wherein the cylinders are provided with agitation means or with inwardly flaring peripheral lips at their lower ends for creating local turbulence for start-up ortho-kinetic flocculation within the cylinders.

12. Apparatus according to claim 7, which includes bypass means for providing a liquid bypass around the cylinder.

* * * * *